United States Patent
Drake et al.

(10) Patent No.: US 8,644,999 B2
(45) Date of Patent: Feb. 4, 2014

(54) KEEP ALIVE METHOD FOR RFD DEVICES

(75) Inventors: Jeff Donald Drake, Louisville, KY (US); Robert Marten Bultman, Louisville, KY (US); William Anthony Watts, Louisville, KY (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 13/160,804

(22) Filed: Jun. 15, 2011

(65) Prior Publication Data

US 2012/0323391 A1  Dec. 20, 2012

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *G01M 1/38* | (2006.01) |
| *G05B 13/00* | (2006.01) |
| *G05B 15/00* | (2006.01) |
| *G05D 23/00* | (2006.01) |
| *F24F 3/00* | (2006.01) |

(52) U.S. Cl.
USPC ........... 700/296; 700/276; 700/277; 700/291; 700/295

(58) Field of Classification Search
USPC .......... 700/276–278, 291, 295–297; 165/205, 165/208, 288; 236/1 B, 91 E
See application file for complete search history.

(56) References Cited

U.S. PATENT DOCUMENTS

| | | | |
|---|---|---|---|
| 6,624,750 B1 * | 9/2003 | Marman et al. | 340/506 |
| 6,697,103 B1 * | 2/2004 | Fernandez et al. | 348/143 |
| 7,289,016 B2 * | 10/2007 | Luebke et al. | 340/309.16 |
| 8,005,944 B2 * | 8/2011 | Fowler et al. | 709/224 |
| 2001/0025349 A1 * | 9/2001 | Sharood et al. | 713/340 |
| 2003/0151513 A1 * | 8/2003 | Herrmann et al. | 340/573.1 |
| 2005/0171662 A1 * | 8/2005 | Strege et al. | 701/33 |
| 2006/0018295 A1 * | 1/2006 | Choi et al. | 370/338 |
| 2008/0088018 A1 * | 4/2008 | Yoon | 257/738 |
| 2008/0129495 A1 * | 6/2008 | Hitt | 340/539.26 |
| 2008/0261628 A1 * | 10/2008 | Proctor et al. | 455/458 |
| 2010/0188988 A1 | 7/2010 | Mulligan et al. | |
| 2010/0217837 A1 * | 8/2010 | Ansari et al. | 709/218 |

* cited by examiner

*Primary Examiner* — Ramesh Patel
(74) *Attorney, Agent, or Firm* — Global Patent Operation

(57) ABSTRACT

A method and system is disclosed that includes a controller that determines a sleep schedule for reduced function devices on a home network. The devices have various sleep schedules in which to operate in an active state or a reduced function state. The controller determines the different schedules by sending communication messages to each device via a communication module. A timer is used to determine a sleep schedule for reduced function devices (RFDs) on the network. The sleep schedule is used to monitor when the devices are communicating on the network and are no longer able to communicate with the controller.

20 Claims, 2 Drawing Sheets

KEEP ALIVE METHOD FOR RFD DEVICES

BACKGROUND

This disclosure relates to energy management, and more particularly to energy systems and methods with time of use (TOU) and/or demand response (DR) energy programs. The disclosure finds particular application to utility systems and appliances configured to manage energy loads to consumers through a communicating consumer control device, such as a home energy manager (HEM), programmable communicating thermostat (PCT), appliance controller, or the like.

Demand response (DR) appliances are configured to respond to incoming signals from utilities (e.g., for a load shedding event), and/or user inputs for modifying the operation of the appliance (e.g., for energy savings). Coupled with DR appliances a home energy manager (HEM) or home energy gateway (HEG) of a home network provides feedback to a user regarding the performance of the appliances. For example, a user may be able to monitor and/or modify the appliances' responses as well as get feedback on power consumption. In order to reduce high peak power demand, many utilities have instituted time of use (TOU) metering and rates which include higher rates for energy usage during on-peak times and lower rates for energy usage during off-peak times. As a result, consumers are provided with an incentive to use electricity at off-peak times rather than on-peak times and to reduce overall energy consumption of appliances at all times.

There is a need to provide a system that can automatically operate power consuming devices during off-peak hours in order to reduce consumer's electric bills and also to reduce the load on generating plants during on-peak hours. Active and real time communication of energy costs and consumption of appliances to the consumer will enable informed choices of operating the power consuming functions of the appliance.

Further, to better communicate between appliances of a home and inform the user about energy costs and usage there is a need to get specific inputs from all devices within the home area network (HAN) regarding the amount of power each device is consuming. A network manager and methods are disclosed to communicate with end devices of a home more efficiently.

SUMMARY

More specifically, this disclosure provides an energy management system that manages devices on a home network. A network manager that comprises a controller or a processor of the system determines a sleep schedule or times of low/reduced power functioning for reduced function devices (RFDs) communicatively coupled to the network. The RFDs of a home network are end devices that are operable to reduce power consumption and remain in a reduced power functioning state called an inactive or sleep state/mode at varying times depending upon their function. RFDs are not always online and typically are battery powered, and thus are only fully activated during certain periods. The sleep cycles (e.g., low power functioning times) of each RFD can vary. Some RFDs on the home network may remain inactive for extended periods of time while others only for a short period of time. In one aspect of an exemplary embodiment, a controller of the network manages and communicates with the RFDs by dynamically learning the sleep schedules of each RFD in order to efficiently communicate with each device during times of active full powered states when the RFDs are fully functional. As the controller of the system learns the sleep schedule for each RFD, the controller is then able to facilitate communication with each RFD accordingly and is further able to determine whether each RFD is communicating normally on the network or not communicating normally, such as may be the result of a malfunction of the device or the device having been removed from the network.

In another embodiment, a network manager controller determines a sleep schedule or typical sleep intervals for each RFD on the home network. To initially determine the sleep schedule for a device, the controller sends a communication message requiring an application level response to the device and a timer is started. The timer is progressed until a predetermined limit is exceeded or until a response is received from the RFD acknowledging receipt. If the predetermined limit is exceeded, an additional amount of time is added to the predetermined limit and a second or additional communication message that requires an application level response is sent from the controller or network manager device. The process continues until a response is received from the RFD device before the then applicable time limit is exceeded. On subsequent communications with that device, the predetermined time limit for response will be the then current sleep interval for that device. If an acknowledgment is received within that interval, the RFD will be deemed to be in normal communication mode and the sleep interval for that device will not be changed. If acknowledgment is not received with that sleep interval, a second message will be sent requiring acknowledgment within a predetermined interval, which may be the initial predetermined interval, or the then current sleep interval or other suitable interval. If no acknowledgment is received within that interval, the process is repeated until acknowledgment is received or a set number of iterations are performed without receipt. If the set number of iterations is completed without receipt, an abnormal communication condition will be flagged for the device. By this arrangement, the network manager or controller is able to use knowledge of sleep intervals for the various devices as a means to most efficiently communicate with the RFD device and to determine when a device is not operating in a normal communication state, such as may be due to a malfunction of the device or the removal of the device from the network.

DETAILED DESCRIPTION

Methods and systems are disclosure herein for a network manager or central controller to interoperate with any device by communicating effectively. In general, an appliance communication module, for example, does not operate as a reduced function device (RFD), but as a router. However, other devices with which the manager interoperates with may be RFDs. An RFD is characterized by the following: (1) It is not a router and will not route messages to other nodes in the Zigbee network. (2) It may have a reduced power state where it is not able to respond to communications. This typically occurs with devices that are battery powered and need to have long battery life.

Figure 1:
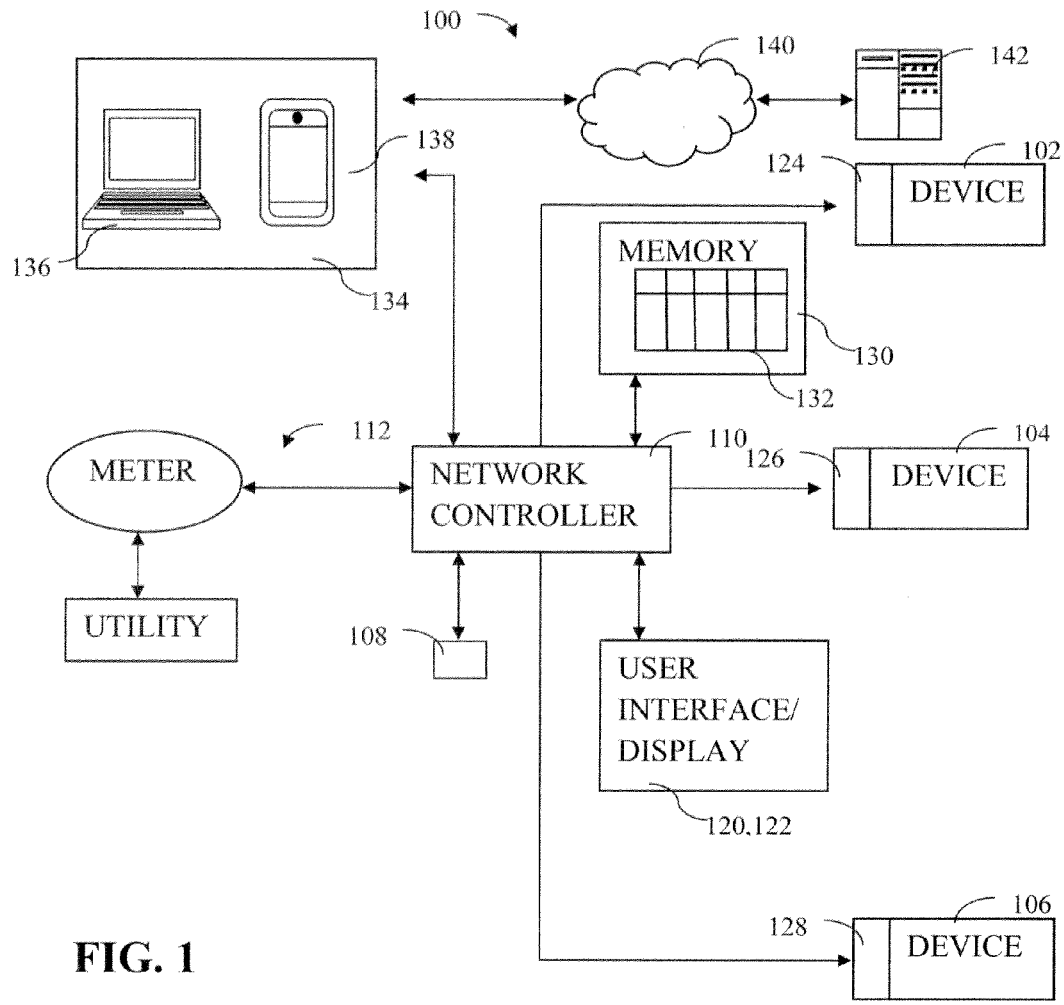
FIG. 1 is a schematic illustration of an energy management system.

FIG. 1 schematically illustrates an exemplary home energy management system 100 for one or more reduced function devices (RFDs) on a home network. RFDs are not always online and operate in a sleep state or active state. Devices 102, 104, 106 include RFDs that are any energy consuming device that can comprise one or more power consuming features/functions. RFDs communicate in a home network, for example, in an 802.15.4 network within a home. Each of the RFDs could be an environmental sensor, smoke detector, motion detector, temperature sensor or other equipment that monitors or controls operation of other devices within any home network. The devices 102, 104, and/or 106 may be other devices also joined on the home area network (HAN). For example, device 104 may be a refrigerator having a sensor, an HVAC system, and/or any energy consuming device capable of having power consumption measured thereat. The devices may also be controllers, or other energy consuming devices other than appliances.

The home energy management system 100 generally comprises a central device or network controller 110 for managing power consumption and network communications within a household via the devices 102, 104, 106 on the HAN. The controller 110 is communicatively connected to each of the devices and selectively sends signals to the devices 102, 104, 106 that have a device communication control module 124, 126, 128 for controlling and processing information received at the device. Each device communication control module 124, 126, 128, in turn, is operable to energize the power consuming features/functions thereof.

The controller 110 is configured to coordinate the devices on the HAN and receive a signal 112 at a communication receiver and process the signal that may be indicative of one or more energy parameters and/or a utility state of an associated energy supplying utility, for example, including availability and/or current cost of supplied energy. There are several ways to accomplish this communication, including, but not limited to, power line carrier (PLC), FM, AM SSB, WiFi, ZigBee, Radio Broadcast Data System, 802.11, 802.15.4, etc. The energy signal may be generated by a utility provider, such as a power company or energy provider, and can be transmitted via a power line, as a radio frequency signal, or by any other means for transmitting a signal when the utility provider desires to reduce demand for its resources. The cost of such resources can be indicative of the state of the demand for the utility's energy, for example a relatively high price or cost of supplied energy is typically associated with a peak demand state/period and a relative low price or cost is typically associated with an off-peak demand state/period.

In one example, a home network that uses the IEEE standard 802.15.4 includes the plurality of devices 1 102, 104, 106 that are RFDs and may also include other network devices, such as full function devices (FFDs). RFDs are not always online or connected operatively within the network and may communicate wirelessly or not. The RFDs are operational in an active (awake mode) state in which full operational power is being consumed and an inactive (sleep mode) state in which less power is drawn. The communication data sent to the RFDs via the network controller 110 is sent and received to establish a communication link. The communication protocol format is in a Zigbee communication cluster (e.g., 802.15.4 MAC/PHY codebases), and can require or request an application response or an acknowledgement of correct reception of packet information by the receiver of the RFDs. The acknowledgement may be used to prevent the sender or the controller 110 from retransmitting packets frequently. At times communications may be lost on the network. For example, packet data may be lost due to long delays suffered. To cope with this, the sending controller 110 provides a request in the communication for an application level response that is an acknowledgement of reception from the receiver or communication module operatively associated with each of the RFDs. Because normal operating conditions for the RFDs include inactive or sleep mode states, during which the RFD will not respond by sending the requested acknowledgment, the controller 110 provides repeated attempts of communication in predetermined time periods established by a timer 108, which indicates time-out events when reference time periods for the respective RFDs are exceeded without receiving an acknowledgment response from the RFD.

Upon receipt of an acknowledgement by controller 110, the controller 110 stores either the times of acknowledgement or the time period during which no response was received or both, in the memory 130 to establish a sleep schedule 132 for each device in order to communicate with the RFD at times or during intervals in which the particular RFD is awake. The sleep schedule is essentially the interval between successive wake periods of the RFD. The controller determines this interval by an iterative process of repeatedly timing the interval between responses received from each of the RFDs until a stable repeatable sleep schedule is determined for each RFD that is added or joined to the network. Controller 110 stores this interval or sleep schedule for each RFD and then uses it as a means to tailor the communications with each RFD. This is important in order to reduce network traffic on the low-bandwidth Zigbee network as well as keeping communications with the RFD to a minimum in order to preserve the battery of the RFD. Additionally, by knowing the sleep schedule of each RFD, it can be known if an RFD is not communicating normally, signifying either a malfunction or removal from the network if it has not responded to requests after some predetermined number of sleep intervals has passed. As a result, once the sleep schedule for each RFD is determined, the controller is operable to send messages to each RFD primarily at times when the RFDs will be active. This can save the expenditure of repeatedly sending communications to each RFD device.

The sleep schedule 132 includes time durations of sleep intervals, that is, inactive states, for each device and times those inactive states occur, for example. To initially establish a sleep schedule for a device, periodic messages are sent by the controller 110 with corresponding time out values set initially at a predetermined value, for example five minutes. In this example, a message is sent every five minutes until an acknowledgment is received. In this example the device is in a sleep mode and no response is received until the $7^{th}$ iteration which corresponds to an elapsed time from the initial message to receipt of 30 minutes. The next such message to this device will have a predetermined time out value of 30 minutes. If no response is received to the next message, a subsequent message will be sent after 30 minutes has elapsed. If no response is received, the timer will be set to a time out value intended to adjust for determining the sleep interval, and the message is sent. If no response is received, when the timer times out, another message is sent and the process is repeated until a response is received, at which time the sleep interval is determined from the waking states or until a repeat limit is exceeded signifying an abnormal communication state for the device. Once determined, the time out value for each subsequent communication message sent by the controller 110 is set at the then current sleep interval for the device according to the established sleep schedule for the device. If the number of iterative attempts exceeds a predetermined limit the device will be determined by the controller to be in an abnormal communication state such as may be due to a device malfunction or removal of the device from the network. The predetermined limit is selected to allow a long enough time to avoid false trips, but short enough to permit timely detection of an abnormal condition. By this arrangement, over time the controller is able to learn whether each RFD is successfully communicating on the network and whether each RFD is no longer able to communicate based on communication attempts and the time out value. For example, the controller receives communications from the RFDs when they are active and determines if they are not operable to communicate on the network when no communication is received during the periods in which the controller knows the RFD to be active based on the sleep schedule.

By way of further example, the home energy system 100 can include a user interface 120 having a display 122 and control buttons for making various operational selections. The display can be configured to provide active, real-time feedback to the user on the cost of operating each appliance 102, 104, 106 as well as the cycle times each RFD operates, whether they are active, inactive, functionally communicating or not. The costs, for example, are generally based on the current operating and usage patterns and energy consumption costs, such as the cost per kilowatt hour charged by the corresponding utility. The controller 110 is configured to gather information and data related to current usage patterns as well as current power costs, and generate historical usage charts therefrom. This information can be used to determine current energy usage and cost associated with using each device/appliance in one of the energy savings mode and normal mode. This real-time information (i.e., current usage patterns, current power cost and current energy usage/cost) can be presented to the user via the display together with whether each RFD is successfully communicating on the network or whether the RFD device is unable to communicate.

The controller 110 connects via Ethernet, WiFi or other communication format to a client application 134 in a personal computer 136 and/or a mobile device 138 to access the Internet 140. This could allow for remote service and monitoring capability. A server 142 can keep records that may be accessed remotely via the internet.

Figure 2:
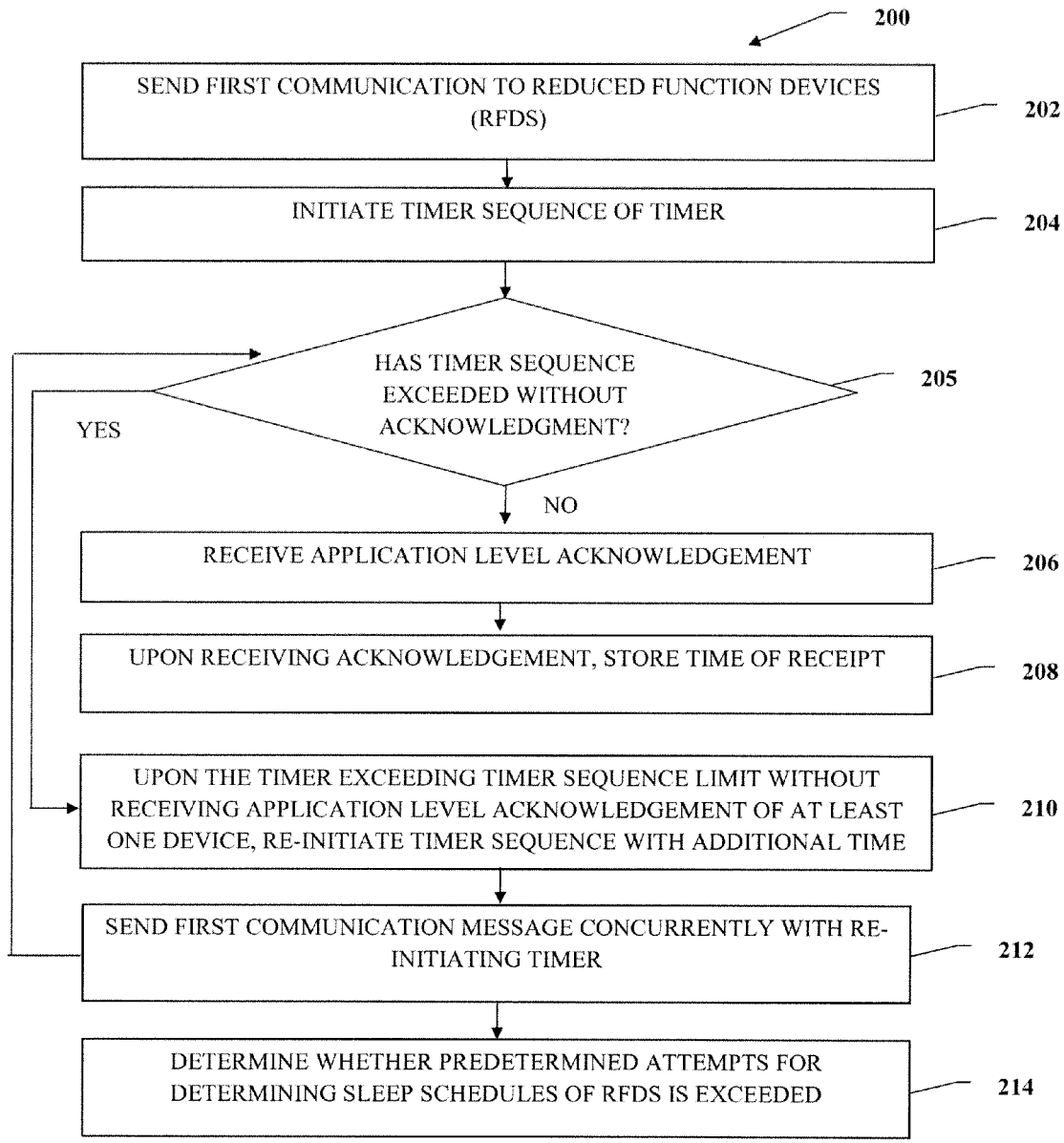
FIG. 2 is a flow diagram illustrating an example methodology for implementing a network system.

Example methodology 200 for a network manager communicatively coupled to a plurality of devices with a home network is illustrated in FIG. 2. While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Referring now to FIG. 2, is an exemplary method for an energy management and monitoring system of a home. The home includes a network controller 110, such as a network manager or network coordinator, in which energy information is communicated through to the home. The controller is a processor, for example, that joins the home devices, such as RFDs to a HAN, where the RFDs are operable as end point devices of the network. The controller is coupled to at least one memory storing executable instruction and is operatively coupled to a power/energy measuring device or meter that measures total power consumed at the home and communicates with an energy provider or utility, for example.

At 202, a controller 110 sends a first communication message to one or more RFDs 102, 104, 106 that are communicatively connected to the home network as end point devices. The first communication message includes a request for an application level acknowledgement or application level response, which is initiated by controller 110 and sent in response to the communication by the RFD or a communication control module therein. For example, the controller may send a communication message via a transceiver or other like first communication module while the RFD 102, 104, and/or 106 receives the message via a second communication module that is also used to send back an acknowledgement or response indicating that the communication has been received. However, no acknowledgment of receipt will be sent by those RFDs, if any that happen to be in a sleep or inactive mode.

At 204, a timer sequence (e.g., a countdown sequence or other predetermined finite time sequence) of a timer is initiated. This enables the controller 110 to monitor timing data between the communication sent and the time to receive the application level acknowledgement or application level response to initially establish a sleep schedule for the RFD and thereafter determine if the RFD is communicating normally.

At 205, a determination is made whether the timer sequence has been exceeded or elapsed without acknowledgement from an RFD. The sequence is exceeded or elapsed if the controller established reference time period has expired without receipt of an acknowledgment from an RFD. The reference time period is the then current sleep interval for the RFD. This can initially be set to some default value and then refined by subsequent iterations. Over time, the sleep interval of the RFD will be determined, as described herein. If the timer sequence has not been exceeded, at least one application level response/acknowledgement is received by the controller 110. Upon receiving an application level response/acknowledgement, a time collected from a timer 108 is stored in a memory 130 that corresponds to when the acknowledgement has been received at 208. Exiting box 205 will occur in one of two ways. If the timer sequence has been exceeded, this indicates that the estimated sleep interval is too short and must be extended. This path goes to 210. The second way of exiting 205 is if a response is received before the timer sequence has been exceeded. This indicates that the sleep interval for the RFD has been established and the path should continue through 206.

At 210, upon the timer exceeding a time sequence limit without the controller receiving the application level response/acknowledgement from an RFD, an amount of time is added to the time sequence and the timer is re-initiated with the timer sequence and the amount of time added.

At 212, an additional first communication message is sent by the controller 110 with a request for an application level response/acknowledgement concurrently with re-initiating the timer. This process may be repeated for a predetermined number of times at varying intervals until an application level response is received for each RFD and the network controller determines a sleep schedule for each RFD.

At 214, a predetermined number of attempts for learning a sleep schedule of each RFD is used to determine whether the devices are communicating and operational or non-communicating and no-longer operational on the network. For example, after multiple attempts the battery of the device may need replacing. A predetermined number of communication attempts to determine an RFD's sleep schedule may be based on the device and an expected time of operation. These times may be small or large depending on the type of device, such as a sensor, an environmental sensor, a smoke detector, motion detector, any other type of monitoring equipment and/or device having a reduced power functioning mode or sleep state of operation. The sleep times and schedules vary among RFDs and learning each of those sleep times and schedules enables the controller 110 to check if the device is successfully communicating on the network or whether the device is no longer able to communicate. For example, when the second communication message has been sent and no response or application level acknowledgement is received by the controller, then the RFD may be determined as not able to communicate on the network. The process of the method may then be repeated in order to re-determine a new sleep schedule that has changed, if the RFD is still able to communicate, but is on a different sleep schedule, or whether the device is not able to communicate. If the network controller is no longer able to communicate with the RFD, the schedule determination algorithm should be repeated. Failure to re-determine the sleep schedule is an indication that the device is no longer on the network.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method for a network controller of a home energy management system with at least one memory storing executable instructions for the method, comprising:
   sending a communication message to one or more reduced function devices communicatively connected to the home network;
   retrieving an application level response or acknowledgement from the one or more reduced function devices of the home network; and
   determining a sleep schedule for each of the reduced function devices communicatively connected on the home network.

2. The method of claim 1, wherein the reduced function devices include energy consuming devices that comprise at least one demand response appliance configured to manage power consumption.

3. The method of claim 2, wherein the reduced function devices respond to communication commands from a device controller thereat and comprise at least one of an HVAC, a refrigerator, a dishwasher, a dryer and any other power consuming device configured to operate at power levels detected by a power/energy measuring device operatively connected to the home network.

4. The method of claim 1, comprising:
   storing the sleep schedule in the memory with times during which each reduced function device is operable to receive communication messages from the controller in an active state.

5. The method of claim 1, comprising:
   sending communication messages to each reduced function device with a corresponding time out value that is based on the sleep schedule determined; and
   determining whether the device is communicating on the home network and whether the device is not able to communicate based on the time out value being exceeded before a device response is received.

6. The method of claim 5, comprising:
   re-determining a sleep schedule that has changed for the device when the device is still able to communicate and is not communicating according to the sleep schedule determined, wherein the time out value is equal to a time determined with the sleep schedule in which the reduced function device is not in a sleep mode.

7. The method of claim 1, wherein the reduced function devices include at least two reduced function devices with different sleep schedules having different times to operate in an active mode and a sleep mode.

8. A method for an energy management system comprising a controller of a home network of a home with at least one memory storing executable instructions for the method, comprising:
   sending a first communication message that requests an application level response to one or more reduced function devices communicatively connected to the home network by the controller;
   initiating a time sequence of a timer;
   retrieving the application level response from the one or more reduced function devices of the home network;
   storing in the memory a time from the timer that the application level response is retrieved for each of the reduced function devices that the response is retrieved from; and
   sending a second communication message with an application level response request with a time out value to the one or more reduced function devices of the network from which the application level response is retrieved from.

9. The method of claim 8, comprising:
   determining a sleep schedule for each of the reduced function devices on the home network from the time stored.

10. The method of claim 8, comprising:
    upon the timer exceeding a time sequence limit without retrieving the application level response, adding an amount of time to the time sequence and re-initiating the timer with the time sequence and the amount of time added thereto.

11. The method of claim 10, comprising:
    sending an additional first communication message that requests an application level response to one or more reduced function devices concurrently with re-initiating the timer.

12. The method of claim 9, wherein sending the second communication message with the application level response request having the time out value includes sending the second communication message at predetermined intervals that are based on the sleep schedule for each device.

13. The method of claim 8, wherein the time value is substantially equal to a sleep time that is different for one or more of the reduced function devices.

14. The method of claim 8, comprising:
    determining whether each reduced function device is operable to communicate on the home network from a response retrieved based on the second communication message sent and whether each reduced function device has a sleep schedule that has changed when the response is not retrieved.

15. An energy management system for a home area network (HAN) having managed reduced function devices for a home that respectively draw different amounts of power from a source of power, the system comprising:
    a power/energy measuring device in communication with the managed devices that provides an energy/power consumption measurement for the home;
    a controller that is in communication with the reduced function devices and having a memory for storing sleep schedules of each reduced function device, comprising:
       a first communication module that is in communication with the power/energy measuring device;
       a second communication module that is in communication with the reduced function devices of the home and configured to retrieve an application level response from the devices in response to a communication message sent therefrom; and a timer that clocks a sleep time for each device depending upon the application level response retrieved;

wherein the central controller is configured to monitor and manage energy consumption of each of the reduced function devices by sending communications to each of the devices to determine a sleep schedule respectively.

16. The system of claim 15, wherein the power/energy measuring device comprises a smart energy meter communicatively coupled to the controller at the first communications module, and wherein the central controller is configured to store the data from the energy/power measuring device from a Zigbee cluster.

17. The system of claim 15, wherein the controller is configured to attach a time out value to the communication message sent via the second communication module based on the sleep schedule determined.

18. The system of claim 15, wherein each reduced function device is configured to respond to the communication message with an application level response that acknowledges receipt of the communication message when in an active state and when in a reduced function state.

19. The system of claim 15, wherein the controller is configured to determine whether each reduced function device is communicating on the home network.

20. The system of claim 19, wherein the reduced function devices comprise different sleep schedules respectively.

* * * * *